United States Patent
Ebenezer et al.

(10) Patent No.: US 7,038,023 B2
(45) Date of Patent: May 2, 2006

(54) FIBRE REACTIVE AZO DYES

(75) Inventors: Warren James Ebenezer, Stockport (GB); Werner Russ, Flörsheim-Wicker (DE)

(73) Assignee: DyStar Textilfarben GmbH & Co. Deutschland KG, (DE)

( * ) Notice: Subject to any disclaimer, the term of this patent is extended or adjusted under 35 U.S.C. 154(b) by 48 days.

(21) Appl. No.: 10/901,729

(22) Filed: Jul. 29, 2004

(65) Prior Publication Data
    US 2005/0036965 A1    Feb. 17, 2005

(30) Foreign Application Priority Data
    Aug. 15, 2003 (GB) .................. 0319234

(51) Int. Cl.
    *C09B 62/04*    (2006.01)
    *C09B 62/09*    (2006.01)
    *D06P 1/382*    (2006.01)

(52) U.S. Cl. .................. 534/634; 534/617; 534/68; 534/624; 8/549

(58) Field of Classification Search ........... 534/617, 534/618, 624, 634; 8/549
    See application file for complete search history.

(56) References Cited

U.S. PATENT DOCUMENTS

| | | | |
|---|---|---|---|
| 4,453,945 A * | 6/1984 | Miyamoto et al. ............ | 8/543 |
| 4,686,286 A | 8/1987 | Niwa et al. | |
| 4,973,671 A | 11/1990 | Pandl et al. | |
| 5,821,347 A | 10/1998 | Dannheim | |

FOREIGN PATENT DOCUMENTS

| | | |
|---|---|---|
| DE | 3520287 A1 | 12/1985 |
| DE | 232624 | 2/1986 |
| DE | 195 48 429 A1 | 6/1997 |
| EP | 0 042 204 A2 | 12/1981 |
| EP | 0 252 508 A2 | 1/1988 |
| EP | 0 256 650 | 2/1988 |
| EP | 0 315 045 | 5/1989 |
| GB | 2 065 159 A | 6/1981 |
| GB | 1 527 949 | 10/1988 |

OTHER PUBLICATIONS

Text. Chem. Color, "Ink Jet Printing for Textiles", vol. 19(8), Aug. 1987, pp. 23-29.
Text. Chem. Color, "Analyzing Carpet Samples for Formaldehyde Content". vol. 21, May 1989, pp. 27-29.

* cited by examiner

*Primary Examiner*—Fiona T. Powers
(74) *Attorney, Agent, or Firm*—Connolly Bove Lodge & Hutz

(57) ABSTRACT

The present invention refers to dyestuffs of the formula I

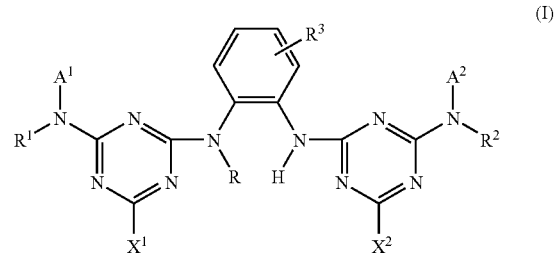

wherein
R is an optionally substituted alkyl group;
each of $R^1$, $R^2$ and $R^3$, independently, is H or an optionally substituted alkyl group;
each of $X^1$ and $X^2$, independently, is a labile atom or group; and
each of $A^1$ and $A^2$, independently, is a chromophoric residue, processes for their preparation and their use for dyeing and printing hydroxy- and/or carboxamido-containing fiber materials.

13 Claims, No Drawings

FIBRE REACTIVE AZO DYES

The present invention relates to the field of fibre-reactive dyes.

Dyestuffs containing chromophores linked via a phenylene diamine linking unit are known from literature and are described for example in EP-A-0256650 and EP-A-031 5045. EP-A-0256650 discloses dyestuffs with N-alkyl-para- or meta-phenylene diamine linking groups and EP-A-0315045 discloses dyestuffs with a N-alkyl-meta-phenylene diamine linking group.

The inventor of the present invention has surprisingly found that dyestuffs which are obtained if N-alkly-ortho-phenylene diamine type linking units are used to link two chromophores are particularly suitable for hot dyeing (70–95° C.) of cellulose fibres under exhaust conditions and lead to dyeings, which are strong, level and bright and exhibit excellent fastness properties particularly to washing. Additionally, unfixed dye is very easily washed from the fibre after the dyeing process.

The present invention claims dyestuffs of the formula I

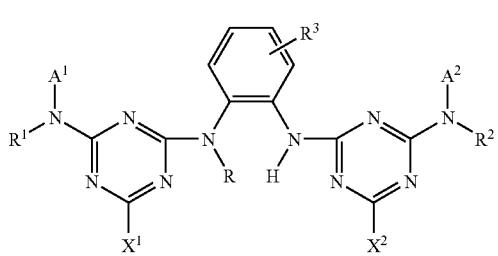

(I)

wherein
R is an optionally substituted alkyl group;
each of $R^1$, $R^2$ and $R^3$, independently, is H or an optionally substituted alkyl group;
each of $X^1$ and $X^2$, independently, is a labile atom or group; and
each of $A^1$ and $A^2$, independently, is a chromophoric residue.
R is preferably $C_1$–$C_4$-alkyl, like methyl, ethyl, n-propyl, i-propyl and n-butyl or $C_1$–$C_4$-alkyl, which is substituted by hydroxyl, like 2-hydroxyethyl, $(C_1$–$C_4)$-alkoxy, halogen, like chlorine and fluorine, or
$NHCO(C_1$–$C_4)$-alkyl, like NHCOMe. R is especially preferably methyl.
$R^1$, $R^2$ and $R^3$, independently, are preferably H or $(C_1$–$C_4)$-alkyl and especially preferably H or methyl
$X^1$ and $X^2$, independently, are preferably halogen, like fluorine, chlorine and bromine;
$C_1$–$C_4$-alkoxy, like methoxy and ethoxy;
OAr wherein Ar is an aryl residue, like phenyl; or optionally substituted pyridinium like 3- and 4-carboxypyridinium. $X^1$ and $X^2$ are especially preferably chlorine.

A chromophoric residue representing $A^1$ and $A^2$ can be any water-soluble chromophore which is usable in dyestuff chemistry. Such chromophores especially comprise monoazo, bisazo, polyazo, metal complex azo, anthraquinone, phthalocyanine, formazan and dioxazine residues.

Preferred chromophoric residues are monoazo and bisazo residues.

Monoazo chromophores can for example correspond to the general formula (II)

$D^2\text{-N}{=}\text{N-}D^1\text{*}$ (II)

wherein each of $D^1$ and $D^2$, independently, is phenyl or naphthyl and * indicates the bond to the $NR^1$ or $NR^2$ group of formula (I) and wherein $D^1$ and/or $D^2$ carry up to 5 $SO_3M$ groups and up to 5 additional substituents selected from the group consisting of hydroxyl, amino, $(C_1$–$C_4)$-alkyl, $(C_1$–$C_4)$-alkoxy, $NHCO(C_1$–$C_4)$-alkyl and $NH(C_1$–$C_4)$-alkyl.

M in the $SO_3M$ group is H, an alkali metal, an ammonium ion or the equivalent of an alkaline earth metal and is preferably H, sodium or potassium.

Preferred examples of monoazo chromophores of the formula (II) are the formulae (IIa) to (IIb)

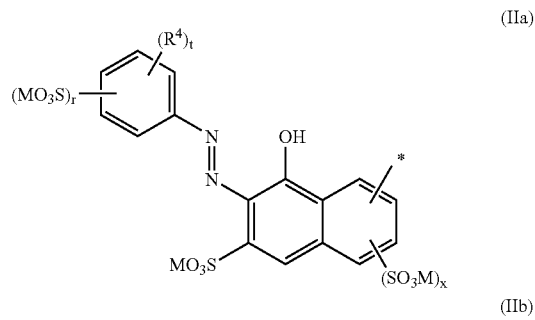

(IIa)

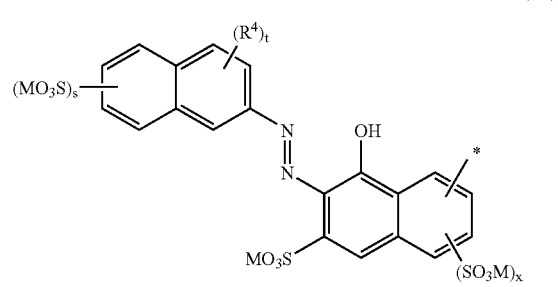

(IIb)

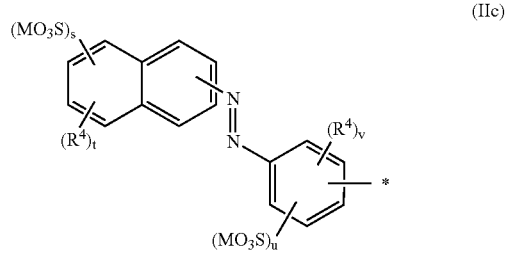

(IIc)

wherein
each of $R^4$, independently, is hydroxyl, amino, $(C_1$–$C_4)$-alkyl, $(C_1$–$C_4)$-alkoxy, $NHCO(C_1$–$C_4)$-alkyl, $NH(C_1$–$C_4)$-alkyl or $NHCONH_2$;
r is 1 or 2;
s is 1, 2 or 3;
t is 0, 1, 2 or 3;
u is 0 or 1:
v is 0, 1 or 2;
x is 0 or 1 and
* and M are defined as given above.

Especially preferred examples of monoazo chromophores of the formula (II) are formulae (a), (b), (c), (d), (f), (g), (h) and (k) given below.

Bisazo chromphores can for example correspond to the general formula (III)

$D^2\text{-N}{=}\text{N-}D^3\text{-N}{=}\text{N-}D^1\text{*}$ (III)

wherein $D^1$, $D^2$ and * are defined as given above and $D^3$ is a phenylene or naphthylene group and wherein $D^1$, $D^2$ and/or $D^3$ carry up to 6 $SO_3M$ groups, wherein M is defined as given above, and up to 6 additional substituents selected from the group consisting of hydroxyl, amino, $(C_1–C_4)$-alkyl, $(C_1–C_4)$-alkoxy, $NHCO(C_1–C_4)$-alkyl, $NH(C_1–C_4)$-alkyl and $NHCONH_2$.

Preferred examples of bisazo chromophores of the formula (III) are the formulae (IIIa) to (IIIc)

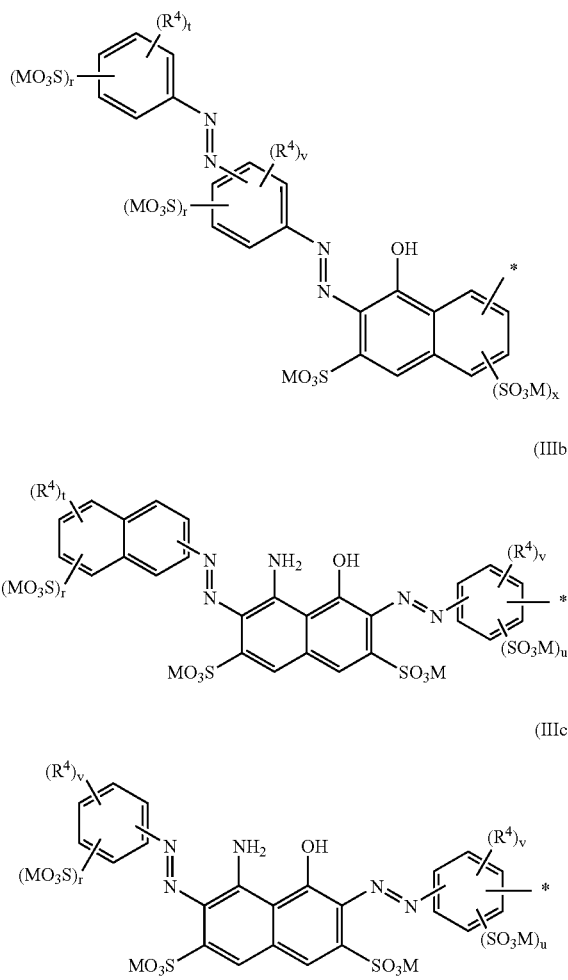

wherein
each of $R^4$, independently, is hydroxyl, amino, $(C_1–C_4)$-alkyl, $(C_1–C_4)$-alkoxy, $NHCO(C_1–C_4)$-alkyl or $NH(C_1–C_4)$-alkyl;
r is 1 or 2;
s is 1, 2 or 3;
t is 0, 1, 2 or 3;
u is 0 or 1:
v is 0, 1 or 2;
x is 0 or 1 and
* and M are defined as given above.

Especially preferred examples of bisazo chromophores of the formula (III) are formulae (e), (i) and (j) given below.

The chromophoric groups $A^1$ and $A^2$ can have different meanings but preferably have the same meaning, this means that $A^1=A^2$.

The dyestuffs of the present invention can be present as a preparation in solid or liquid (dissolved) form. In solid form they generally contain the electrolyte salts customary in the case of water-soluble and in particular fibre-reactive dyes, such as sodium chloride, potassium chloride and sodium sulfate, and also the auxiliaries customary in commercial dyes, such as buffer substances capable of establishing a pH in aqueous solution between 3 and 7, such as sodium acetate, sodium borate, sodium bicarbonate, sodium citrate, sodium dihydrogen-phosphate and disodium hydrogenphosphate, small amounts of siccatives or, if they are present in liquid, aqueous solution (including the presence of thickeners of the type customary in print pastes), substances which ensure the permanence of these preparations, for example mold preventatives.

In general, the dyestuffs of the present invention are present as dye powders containing 10 to 80% by weight, based on the dye powder or preparation, of a strength-standardizing colorless diluent electrolyte salt, such as those mentioned above. These dye powders may additionally include the aforementioned buffer substances in a total amount of up to 10%, based on the dye powder. If the dye mixtures of the present invention are present in aqueous solution, the total dye content of these aqueous solutions is up to about 50% by weight, for example between 5 and 50% by weight, and the electrolyte salt content of these aqueous solutions will preferably be below 10% by weight, based on the aqueous solutions. The aqueous solutions (liquid preparations) may include the aforementioned buffer substances in an amount which is generally up to 10% by weight, for example 0.1 to 10% by weight, preference being given to up to 4% by weight, especially 2 to 4% by weight.

A dyestuff of the formula I may for example be prepared by reacting an ortho-phenylenediamine of the formula (IV)

wherein R and $R^3$ are defined as given above, with a compound of the formula (V)

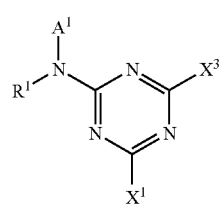

wherein $A^1$, $R^1$ and $X^1$ are defined as given above and $X^3$ is a labile atom or a group capable of reaction with an amine, preferably chlorine, and with a compound of the formula VI

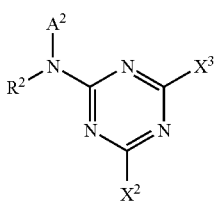

(VI)

wherein $A^2$, $R^2$, $X^2$ and $X^3$ are defined as given above.

In case $A^1$ and $A^2$ are not identical usually the compound of formula IV is first reacted with a compound of the formula VI to form a compound of the formula VII

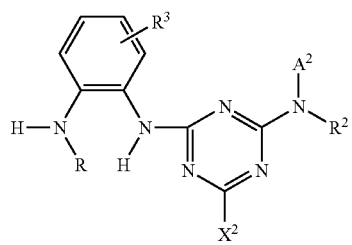

(VII)

wherein all variables are defined as given above, which is then reacted with a compound of the formula V to a dyestuff of the formula I.

In general, one mole of a compound of the formula IV is reacted with 1 mole of a compound of the formula V and 1 mole of a compound of the formula VI in a manner known per se to a skilled person.

When preparing preferred compounds of the formula I wherein $A^1=A^2$ 1 mole of a compound of the formula IV is reacted with 2 moles of a compound of the formula V or VI, respectively, in one step to result in the compound of the formula I.

The compounds of the formulae IV, V and VI are known or can easily be prepared by a skilled person using methods which are known per se.

As an example, a compound of the formula V, wherein $X^3$ is chlorine can be obtained by reacting cyanuric chloride with a compound of the formula VIII

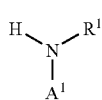

(VIII)

wherein $R^1$ and $A^1$ are defined as given above.

The compounds of the formula VIII can be prepared by means of customary diazotization and coupling reactions in a manner familiar to those skilled in the art.

The dyestuffs of the instant invention are reactive dyestuffs suitable for dyeing and printing hydroxy- and/or carboxamido-containing fibre materials by the application and fixing methods numerously described in the art for fibre-reactive dyes. They provide exceptionally bright, exceptionally strong and economic shades. Such dyes especially when used for exhaust dyeing of cellulosic materials can exhibit excellent properties including build-up, aqueous solubility, light-fastness, wash off and robustness to process variables. They are also is wholly compatible with similar dyes designed for high temperature (80–100° C.) application to cellulosic textiles, and thus lead to highly reproducible application processes, with short application times.

The present invention therefore also provides for use of the inventive dyestuffs for dyeing and printing hydroxy- and/or carboxamido-containing fibre materials and processes for dyeing and printing such materials using a dyestuff according to the invention. Usually the dyestuff is applied to the substrate in dissolved form and fixed on the fibre by the action of an alkali or by heating or both.

Hydroxy-containing materials are natural or synthetic hydroxy-containing materials, for example cellulose fiber materials, including in the form of paper, or their regenerated products and polyvinyl alcohols. Cellulose fiber materials are preferably cotton but also other natural vegetable fibers, such as linen, hemp, jute and ramie fibres. Regenerated cellulose fibers are for example staple viscose and filament viscose.

Carboxamido-containing materials are for example synthetic and natural polyamides and polyurethanes, in particular in the form of fibers, for example wool and other animal hairs, silk, leather, nylon-6,6, nylon-6, nylon-11, and nylon-4.

Application of the inventive dyestuffs is by generally known processes for dyeing and printing fiber materials by the known application techniques for fibre-reactive dyes. The dyestuffs according to the invention are highly compatible with similar dyes designed for high temperature (80–100° C.) applications and are advantageously useful in exhaust dyeing processes.

Similarly, the conventional printing processes for cellulose fibers, which can either be carried out in single-phase, for example by printing with a print paste containing sodium bicarbonate or some other acid-binding agent and the colorant, and subsequent steaming at appropriate temperatures, or in two phases, for example by printing with a neutral or weakly acid print paste containing the colorant and subsequent fixation either by passing the printed material through a hot electrolyte-containing alkaline bath or by overpadding with an alkaline electrolyte-containing padding liquor and subsequent batching of this treated material or subsequent steaming or subsequent treatment with dry heat, produce strong prints with well defined contours and a clear white ground. Changing fixing conditions has only little effect on the outcome of the prints. Not only in dyeing but also in printing the degrees of fixation obtained with dye mixtures of the invention are very high. The hot air used in dry heat fixing by the customary thermofix processes has a temperature of from 120 to 200° C. In addition to the customary steam at from 101 to 103° C., it is also possible to use superheated steam and high pressure steam at up to 160° C.

The inventive dyestuffs can in addition be used to produce inks useful for printing the substrates described above, for example textiles, especially cellulosic textiles, and paper.

Such inks can be used in all technologies, for example conventional printing, ink-jet printing or bubble-jet printing (for information on such printing technologies see for example Text. Chem. Color, Volume 19(8), pages 23 ff).

Acid-binding agents responsible for fixing the dyes to cellulose fibers are for example water-soluble basic salts of alkali metals and of alkaline earth metals of inorganic or organic acids, and compounds which release alkali when hot. Of particular suitability are the alkali metal hydroxides and alkali metal salts of weak to medium inorganic or organic acids, the preferred alkali metal compounds being the sodium and potassium compounds. These acid-binding agents are for example sodium hydroxide, potassium hydroxide, sodium carbonate, sodium bicarbonate, potassium carbonate, sodium formate, sodium dihydrogen-phosphate and disodium hydrogenphosphate.

Treating the dyestuffs according to the invention with the acid-binding agents with or without heating bonds the dyes chemically to the cellulose fibers. Especially the dyeings on cellulose, after they have been given the usual aftertreatment of rinsing to remove unfixed dye portions, show excellent properties.

The dyeings of polyurethane and polyamide fibers are customarily carried out from an acid medium. The dyebath may contain for example acetic acid and/or ammonium sulfate and/or acetic acid and ammonium acetate or sodium acetate to bring it to the desired pH. To obtain a dyeing of acceptable levelness it is advisable to add customary leveling auxiliaries, for example based on a reaction product of cyanuric chloride with three times the molar amount of an aminobenzenesulfonic acid or aminonaphthalenesulfonic acid or based on a reaction product of for example stearylamine with ethylene oxide. In general the material to be dyed is introduced into the bath at a temperature of about 40° C. and agitated therein for some time, the dyebath is then adjusted to the desired weakly acid, preferably weakly acetic acid, pH, and the actual dyeing is carried out at temperature between 60 and 98° C. However, the dyeings can also be carried out at the boil or at temperatures up to 120° C. (under superatmospheric pressure).

EXAMPLE 1

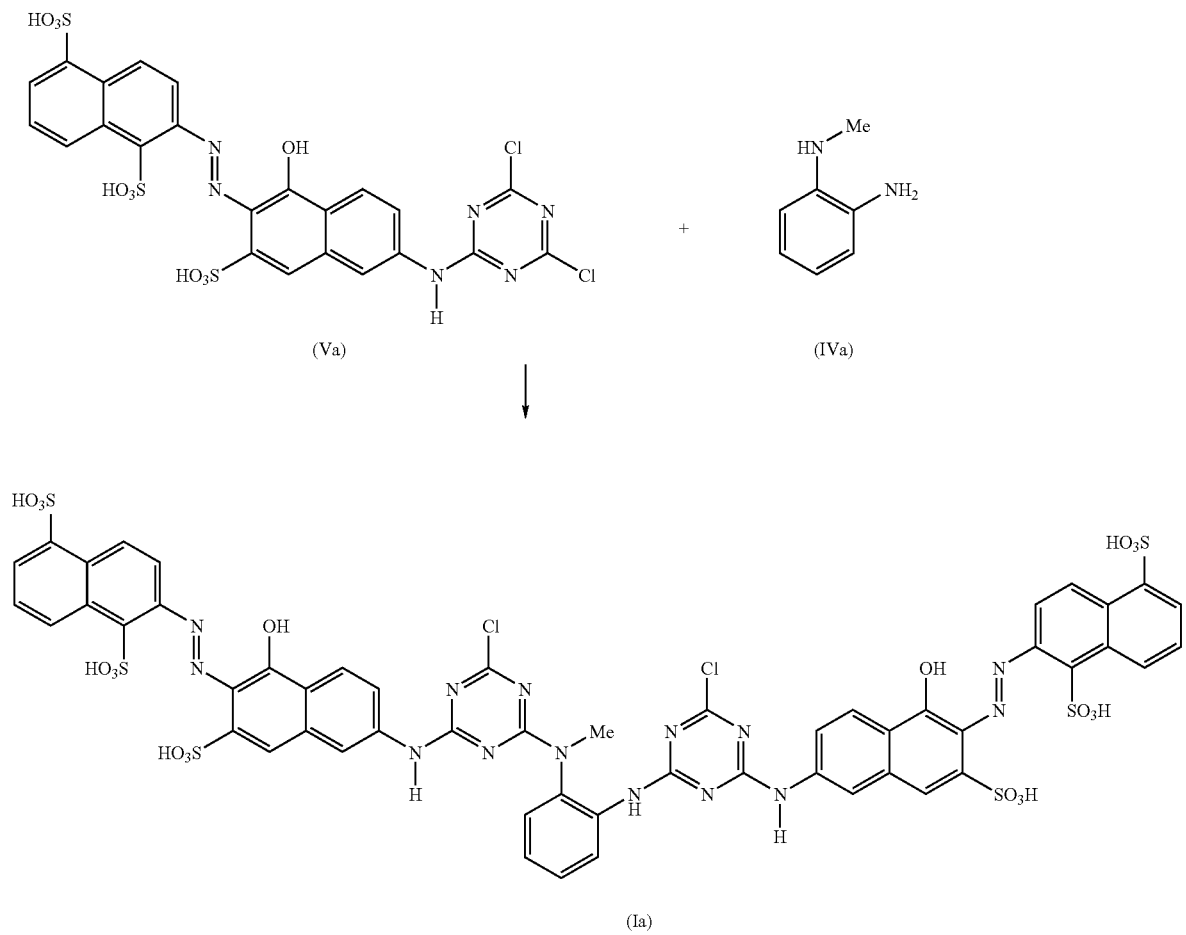

A solution of N-Me-orthophenylene diamine (IVa) (5.1 mmol) and the orange dichlorotriazinyl dye (Va) (10.2 mmol) in water (500 mls) was adjusted to pH 6 and maintained at pH 6 by the addition of 2N sodium carbonate solution whilst heating at 40° C. for 3 days. Subsequent HPLC indicated the reaction to be complete. The product was precipitated by the addition of methylated spirits and was filtered off and dried to give a bright orange powder (8.2 g). Analytical data were consistent with the expected product (Ia) including $\lambda_{max}$=487 nm, $\epsilon_{max}$=74500.

EXAMPLE 2

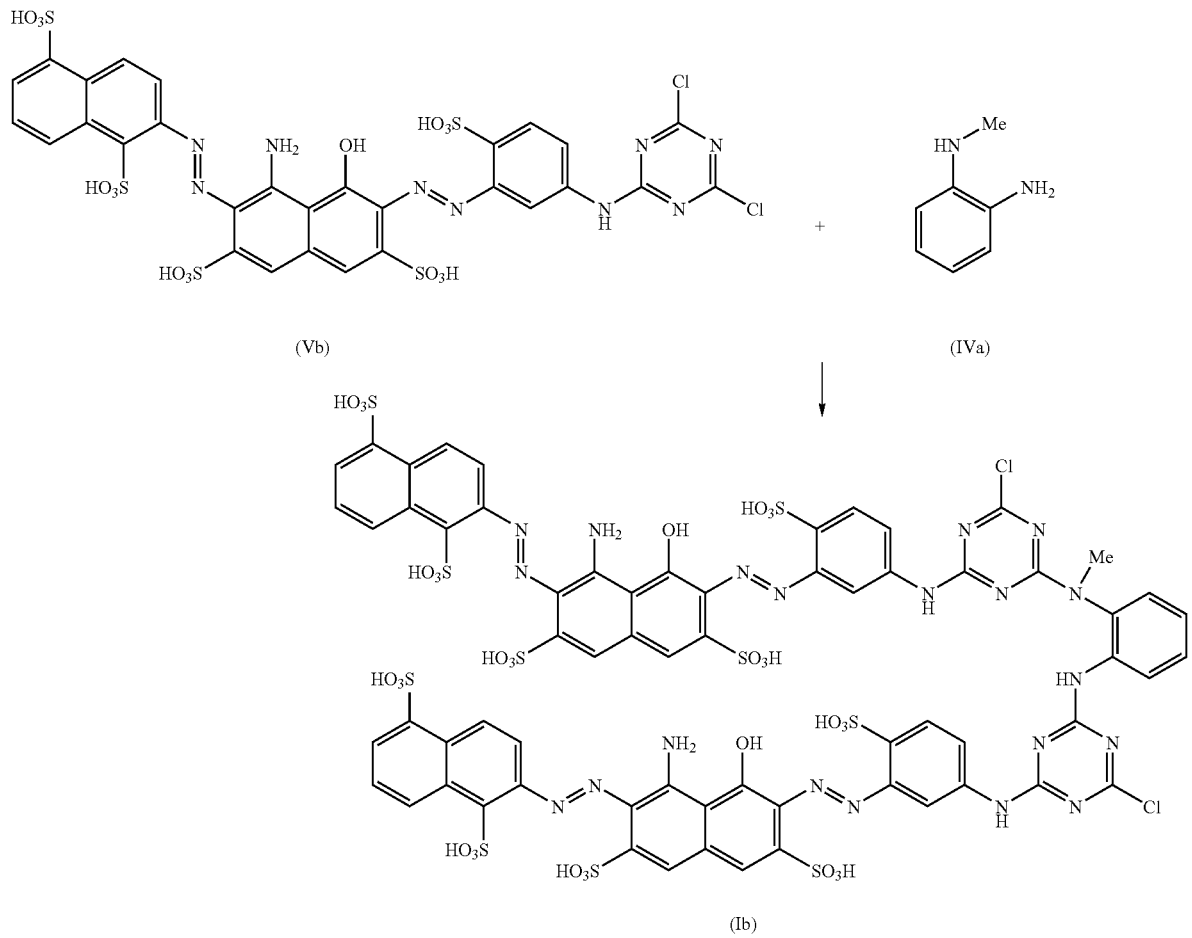

A solution of N-Me-orthophenylenediamine (IVa) (2.5 mmol) and the navy dichlorotriazinyl dye (Vb) (5.0 mmol) in water (200 mls) was adjusted to pH6 and maintained at pH6 by the addition of 2N sodium carbonate solution whilst heating at 45° C. for 16 hours. Subsequent HPLC indicated the reaction to be complete. The product was precipitated by the addition of methylated spirits and was filtered off and dried to give a dark powder (5.2 g). Analytical data were consistent with the expected product (Ib) including $\lambda_{max}$=615 nm $\epsilon_{max}$=112000.

EXAMPLE 3

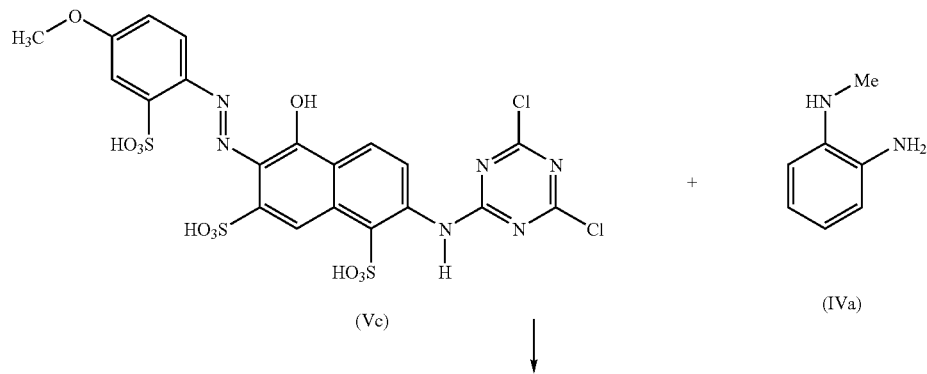

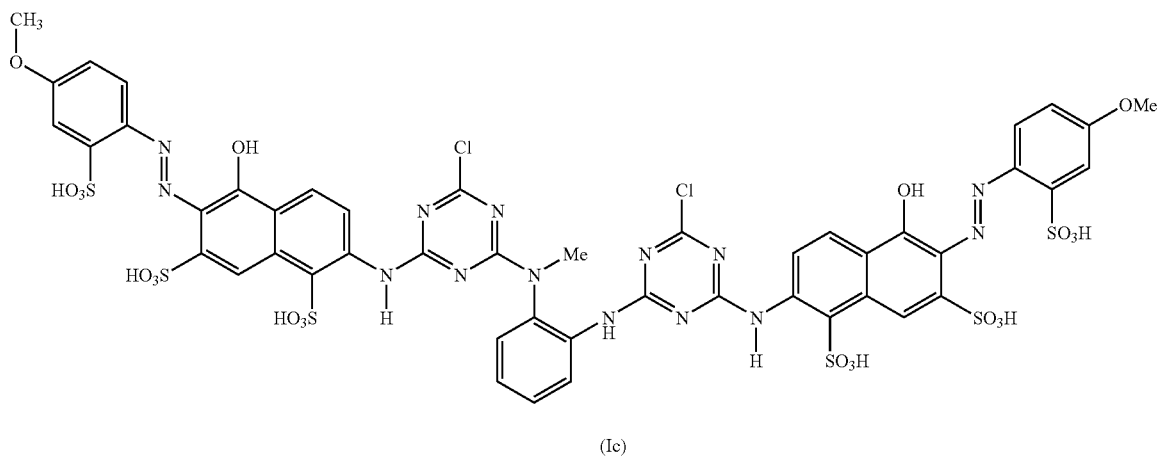

(Ic)

A solution of N-Me-orthophenylenediamine (IVa) (2.7 mmol) and the scarlet dichlorotriazine dye (Vc) (5.4 mmol) in water (200 mls) was adjusted to pH6 and maintained at pH6 by the addition of 2N sodium carbonate solution whilst heating at 50° C. for 10 hours. Subsequent HPLC indicated the reaction to be complete. The product was precipitated by the addition of isopropanol and was filtered off and dried to give a red powder (3.7 g). Analytical data were consistent with the expected product (Ic) including $\lambda_{max}$=503 nm, $\epsilon_{max}$=65000.

EXAMPLES 4 to 22

The compounds of Examples 4 to 22 were prepared in an analogous fashion to examples 1 to 3. In each case analytical data were in full agreement with the respective bis-monochlorotriazinyl structures.

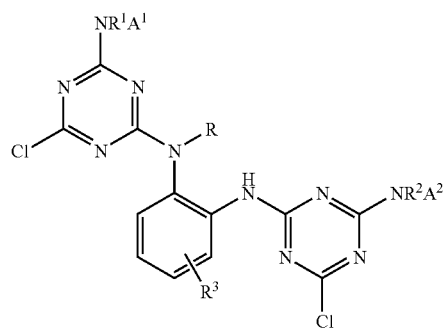

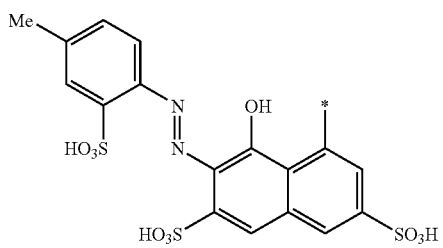

(a)

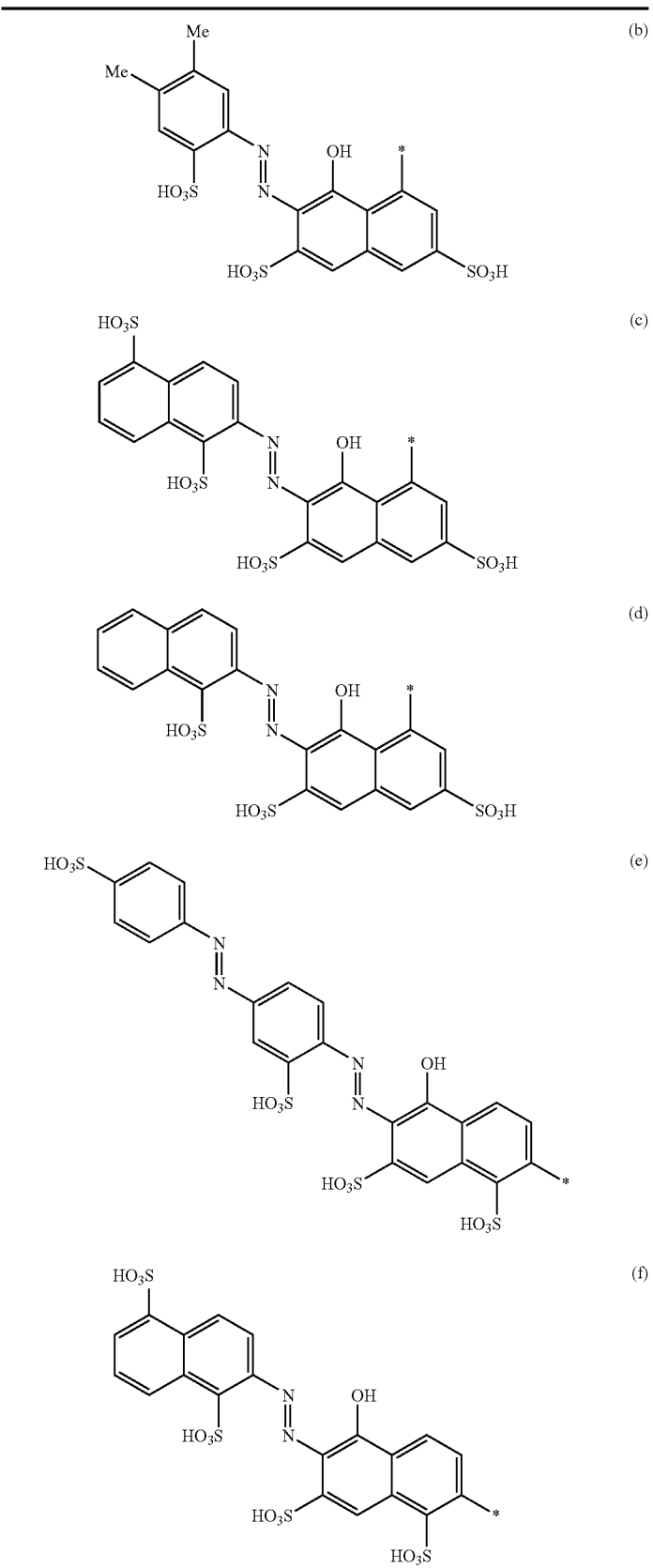

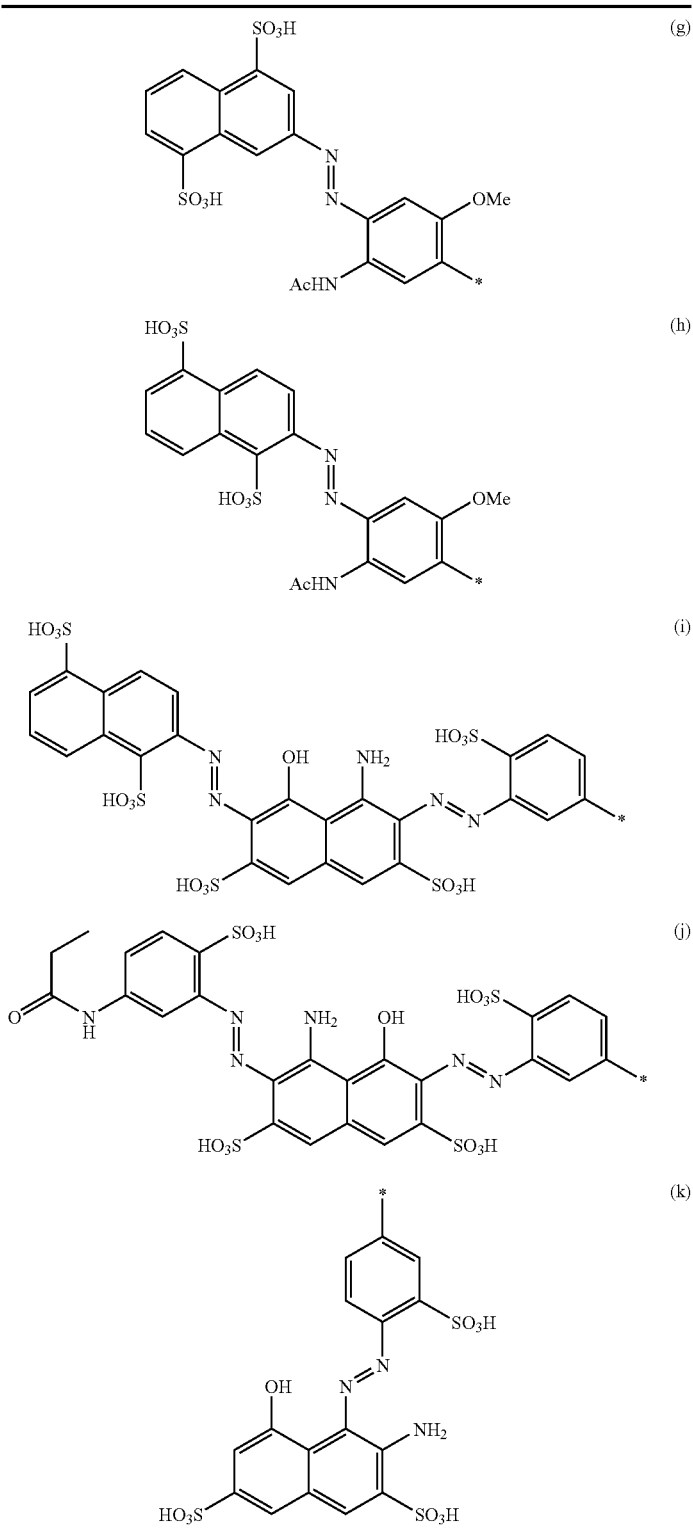
| Example | $A^1 = A^2$ | R | $R^3$ | $R^1 = R^2$ | λ max/nm | ε max |
| --- | --- | --- | --- | --- | --- | --- |
| 4 | a | Me | H | H | 521 | 64500 |
| 5 | b | Me | H | H | 519 | 69500 |
| 6 | c | Me | H | H | 544 | 80000 |
| 7 | d | Me | H | H | 520 | 77000 |
| 8 | e | Me | H | H | 510 | 102000 |

-continued

| # | | | | | | |
|---|---|---|---|---|---|---|
| 9 | f | Me | H | H | 489 | 84500 |
| 10 | g | Me | H | H | 416 | 46000 |
| 11 | h | Me | H | H | 409 | 34500 |
| 12 | i | Me | H | H | 616 | 120500 |
| 13 | j | Me | H | H | 609 | 95000 |
| 14 | k | Me | H | H | 512 | 60500 |
| 15 | g | Me | 1:1 mixture of 4-Me and 5-Me | H | 415 | 46500 |
| 16 | g | Et | H | H | 416 | 47700 |
| 17 | c | CH$_2$CH$_2$OH | H | H | 536 | 79000 |
| 18 | c | CH$_2$CH$_2$CH$_2$OH | H | H | 544 | 85650 |
| 19 | c | Et | H | H | 544 | 84750 |
| 20 | c | CH$_2$CH(Me)OH | H | H | 543 | 84450 |
| 21 | d | CH$_2$CH$_2$OH | H | H | 520 | 68250 |
| 22 | l | Me | H | Me | 506 | 93700 |

The invention claimed is:

1. Dyestuff of the formula I

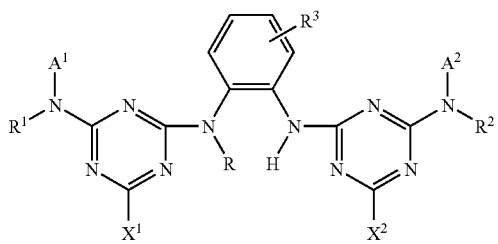

(I)

wherein
- R is an optionally substituted alkyl group;
- each of R$^1$, R$^2$ and R$^3$, independently, is H or an optionally substituted alkyl group;
- each of X$^1$ and X$^2$, independently, is a labile atom or group; and
- each of A$^1$ and A$^2$, independently, is a bisazo, polyazo, metal complex azo, anthraquinoe, phthalocyanine, formazan or dioxazine residue.

2. Dyestuff according to claim 1, wherein R is C$_1$–C$_4$-alkyl, or C$_1$–C$_4$-alkyl, which is substituted by hydroxyl, (C$_1$–C$_4$)-alkoxy, halogen, or NHCO(C$_1$–C$_4$)-alkyl.

3. Dyestuff according to claim 1, wherein R$^1$, R$^2$ and R$^3$, independently, are H or (C$_1$–C$_4$)-alkyl.

4. Dyestuff according to claim 1, wherein X$^1$ and X$^2$, independently, are
- halogen;
- C$_1$–C$_4$-alkoxy;
- OAr wherein Ar is an aryl residue; or
- optionally substituted pyridinium.

5. Dyestuff according to claim 1, wherein each of A$^1$ and A$^2$, independently, is a monoazo chromophore of the general formula (III)

(III)

wherein each of D$^1$ and D$^2$ is phenyl or D$^2$ is phenyl and D$^1$ is naphthyl and * indicates the bond to the NR$^1$ or NR$^2$ group and wherein D$^1$ and/or D$^2$ carry up to 5 SO$_3$M groups and up to 5 additional substituents selected from the group comprising hydroxyl, amino, (C$_1$–C$_4$)-alkyl, (C$_1$–C$_4$)-alkoxy, NHCO(C$_1$–C$_4$)-alkyl and NH(C$_1$–C$_4$)- alkyl, and D$^3$ is phenylene or naphthylene and wherein D$^1$, D$^2$ and/or D$^3$ carry up to 6 SO$_3$M groups, wherein M is H, an alkali metal, an ammonium ion or the equivalent of an alkaline earth metal, and up to 6 additional substituents selected from the group comprising hydroxyl, amino, (C$_1$–C$_4$)-alkyl, (C$_1$–C$_4$)-alkoxy, NHCO(C$_1$–C$_4$)-alkyl and NH(C$_1$–C$_4$)-alkyl.

6. Dyestuff according to claim 5 wherein the bisazo chromophore of the formula (III) corresponds to one of the formulae (IIIa) to (IIIc)

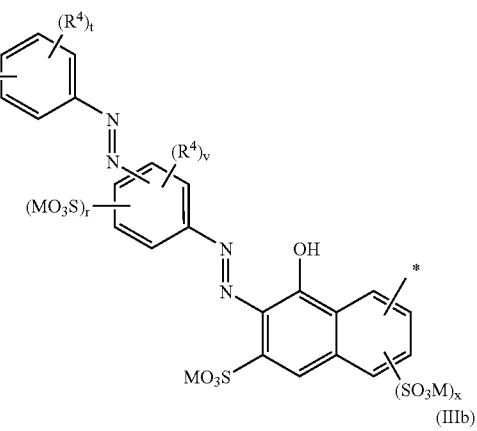

(IIIa)

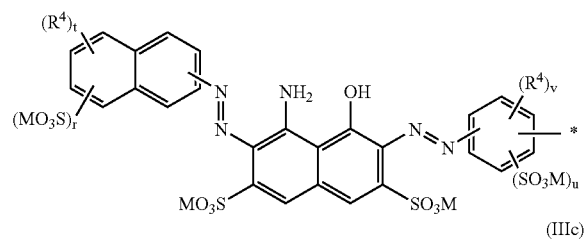

(IIIb)

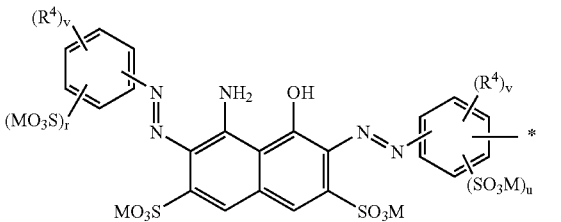

(IIIc)

wherein
each of R$^4$, independently, is hydroxyl, amino, (C$_1$–C$_4$)-alkyl, (C$_1$–C$_4$)-alkoxy, NHCO(C$_1$–C$_4$)-alkyl or NH(C$_1$–C$_4$)-alkyl;

r is 1 or 2;
s is 1, 2 or 3;
t is 0, 1, 2 or 3;
u is 0 or 1:
v is 0, 1 or 2;
x is 0 or 1 and
* and M are defined as given in claim 5.

7. A process for preparing a dyestuff of formula I as claimed in claim 1, which comprises reacting an ortho-phenylenediamine of the formula (IV)

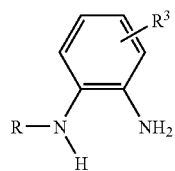

wherein R and R³ are defined as given in claim 1, with a compound of the formula (V)

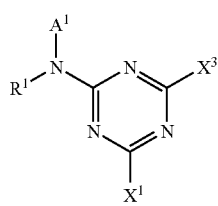

wherein A¹, R¹ and X¹ are defined as given in claim 1 and X³ is a labile atom or a group capable of reaction with an amine, and with a compound of the formula VI

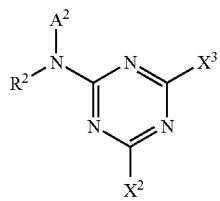

wherein A², R², X² and X³ are defined as given in claim 1.

8. A process for dyeing and printing hydroxy- and/or carboxamido-containing fibre materials which comprises applying a dyestuff of the formula I according to claim 1 to said fibre materials.

9. Dyestuff according to claim 1, wherein R is methyl, ethyl, n-propyl, i-propyl and n-butyl, 2-hydroxyethyl, chlorine, fluorine, or NHCOMe.

10. Dyestuff according to claim 3, wherein X¹ and X², independently, are
fluorine, chlorine, bromine, methoxy, ethoxy, OAr wherein Ar is phenyl; 3-carboxypyridinium or 4-carboxypyridinium.

11. The process according to claim 7, wherein X³ is a labile atom or chlorine.

12. Dyestuff according to claim 1, wherein
R is methyl,
each of R¹, R² and R³, independently, is H or methyl,
X¹ and X² are chlorine,
each of A¹ and A², independently, is a bisazo residue.

13. Dyestuff according to claim 1, wherein A¹ and A² are the same.

* * * * *